Oct. 13, 1931.                G. R. STEERE                1,827,546
                          SELF LEVELING U-GAUGE
                          Filed Aug. 27, 1927
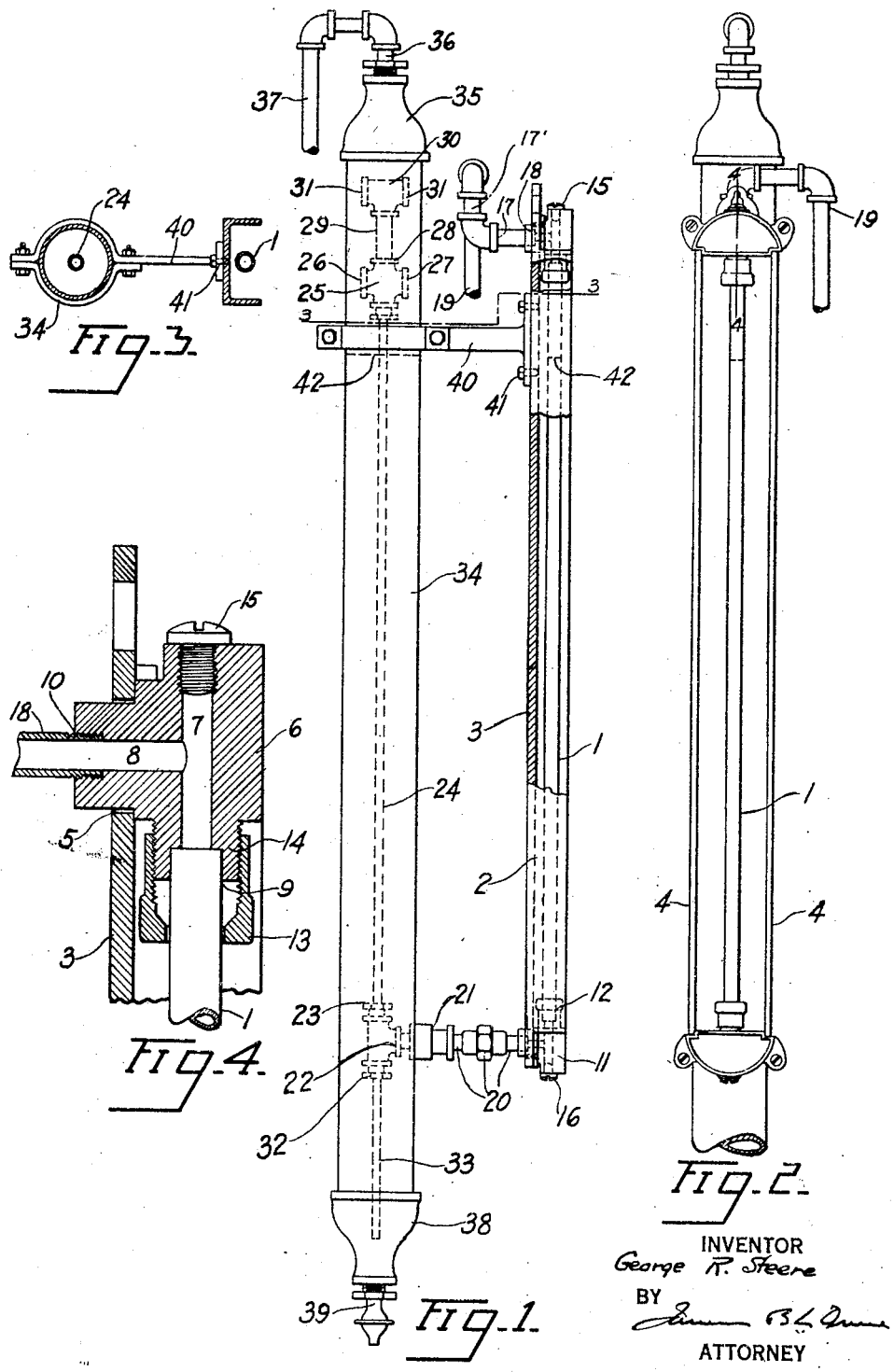
INVENTOR
George R. Steere
BY
ATTORNEY Patented Oct. 13, 1931

1,827,546

UNITED STATES PATENT OFFICE

GEORGE R. STEERE, OF OWOSSO, MICHIGAN, ASSIGNOR TO SEMET-SOLVAY ENGINEERING CORPORATION, OF NEW YORK, N. Y., A CORPORATION OF NEW YORK

SELF-LEVELING U-GAUGE

Application filed August 27, 1927. Serial No. 215,911.

This invention relates to a gauge and more particularly to a differential pressure gauge for air or other fluids.

Differential pressure indicating gauges are usually provided with pressure indicating media, such as liquids including water. Upon the formation of an abnormal pressure in the gauge tube the pressure indicating medium is usually forced out of the tube and on return combines with the air or gas in the tube to form air or gas bubbles, thus impairing the utility of the gauge. Further, in gauges of the U-type it is customary to take readings of the pressure liquid level in each arm of the U and then combine these readings and obtain therefrom the differential pressure corresponding to these levels. This of course, involves considerable time and trouble and due to the necessity for taking a number of readings and calculating the pressure therefrom, there is a greater possibility of introducing error in the results than with a gauge wherein the differential pressure is read directly from the scale. Although there is shown and described herein as an embodiment of my invention a pressure gauge, it will be understood that the invention is not limited to a pressure gauge but may be used to indicate volumes in connection with a Venturi meter or the like.

An object of my invention is to provide a gauge that is simple in construction and efficient in operation. A further object is to provide a self-leveling gauge, that is, a gauge provided with means to restore the pressure liquid which has been forced from the gauge tube by an abnormal pressure to its proper level in said tube without the formation of air or gas bubbles in the indicating pressure liquid. Another object is to provide a self-leveling gauge of the U-type wherein differential pressures can be read directly from a scale.

According to my invention there is provided a pressure indicating device comprising a gauge tube of small capacity, an outer tube of substantial capacity disposed in parallel relation to the gauge tube and of greater length than this tube, an inner tube within the outer tube connected at its lower end to the gauge tube and provided with an extension below said connection vented to the lower portion of the outer tube, the inner tube having its upper portion vented to said outer tube so that the liquid emerging from the upper portion is directed towards the side into the bottom of the outer tube, a pipe connected to a source of pressure and to the top of the gauge tube, and a second pipe connected to a source of lower pressure and to the top of the outer tube.

The invention accordingly comprises a gauge tube, connected to a source of pressure, arranged to contain pressure indicating liquid and in communication with a second tube not concentrically positioned with respect to the first mentioned tube, the second tube being in turn connected to a source of lower pressure, and a container for the second tube, the latter tube having means arranged to permit the discharge of liquid into the container when an abnormal pressure is applied to the gauge tube and which permits the return of the liquid into the gauge tube upon a sufficient decrease of pressure therein.

Other objects and advantages will appear from the following detailed description taken in connection with the accompanying drawings in which Fig. 1 is a side elevation partly broken away and partly in section, of a pressure indicating device illustrating a preferred embodiment of the invention, and showing the level of the liquid in the gauge when both the gauge tube and the outer tube are subjected to equal pressures; Fig. 2 is a fragmentary front elevation corresponding to Fig. 1; Fig. 3 is a section partly in elevation on the line 3—3 of Fig. 1; and Fig. 4 is an enlarged longitudinal section of a detail on the line 4—4 of Fig. 2.

In the preferred embodiment of the invention illustrated on the drawings, 1 indicates a gauge tube of glass or other transparent material mounted in a frame 2 comprising a rear wall 3 provided with suitable graduations indicating pressure in the desired units and side walls 4, 4. Extending through the recess 5 in the wall 3 is a top fitting 6 which has passages or channels 7, 8 disposed at right angles to each other, and is provided with countersunk recesses 9, 10. An identical bottom fitting 11 extends through the lower portion of the rear wall 3 and the gauge tube 1 is securely confined in the recesses 9 and 12 of these fittings by collars 13 surrounding the gauge tube 1 and threadedly engaging nipples 14 preferably formed integral with the fittings 6, 11.

Threaded plug 15 provides a closure for the gauge tube 1 and the passage or channel 7 in the top fitting. If it is desired to increase the amount of pressure indicating liquid in the gauge tube, plug 15 is removed and liquid poured through channel 7 into the gauge tube. Similarly plug 16 provides a closure for the gauge tube 1 and the channel in the bottom fitting 11 and by removing this plug liquid can be drained from the gauge tube.

A pipe 17 has the end 18 screw threaded into countersunk threaded recess 10 in the top fitting 6 and has its other end connected through elbow or other joint to a pipe 17' which extends above the upper end of the gauge tube and connected through a suitable joint to pipe 19, in communication with a source of pressure, higher than that in the outer tube.

A pipe 20 has one end threaded into the countersunk recess in fitting 11 and is connected at the other end through a suitable fitting and stuffing box 21 to a T-fitting 22 which is connected at 23 to an inner tube 24 of substantially the same length as the gauge tube 1. At the upper end the inner tube 24 has threaded thereon a four-way fitting 25 vented at 26, 27 and connected at 28 to a pipe 29, which in turn is connected to the T-fitting 30 vented at 31, 31. The T-fitting 22 has connected at 32 an extension pipe 33 disposed below the junction point of pipes 20 and 24 as shown in Fig. 1.

Tube 24 is positioned within a container or outer tube 34 so that the extension 33 is vented to the bottom of the outer tube, and four-way fitting 25 and the T-fitting 30 are disposed and vented to the top of tube 34. Outer tube 34 is provided with a head 35 having threaded therein a pipe 36 which is connected through elbow or other joint to pipe 37 in communication with the source of lower pressure. The bottom of outer tube 34 has fastened thereon the head 38 having threaded therein the valve 39 by means of which the pressure indicating liquid can be drained from the outer tube and thus from the inner tube and the gauge tube 1.

A clamp 40 is bolted or otherwise secured at 41 to the frame 2 and also to the outer tube 34, thus maintaining the assembly in position.

In preparing the apparatus for use, water or other indicating liquid is poured through channel 7 into gauge tube 1 in sufficient quantities so that flowing through the connection 20, it fills the inner and outer tubes 24, 34 and the gauge tube 1 to the level 42. If the apparatus is to be used as a differential gauge, the pipe 19 is then connected to a source of high pressure, such as air, and pipe 37 is connected to a source of low pressure. The difference in pressure existing between the high pressure source connected at 19 and that at 37 can be read directly on the gauge tube 1.

It may happen that a sudden or abnormal increase of pressure in 19 will entirely displace all the water in the gauge tube 1 as well as in the inner tube 24 and that air will then rush through the device and out through head 35 and pipe 36 into the tube 37. Liquid will be prevented from following the air past the openings 31, striking against the top wall of the T fitting 30 and falling into the outer tube 34.

Thereafter, upon a lowering of the air pressure connected to the pipe 19, both air and water will tend to travel towards gauge tube 1, but only water will be allowed to pass into the gauge tube, and air will be excluded for the reason that the only way in which the air can rush into tube 1 is downwardly through the inner tube 24 through the T fitting 22 and through pipe 20 into the bottom of the gauge tube 1. But the air cannot follow this passage because it is blocked by the water which rises from tube 33 across the fitting 22 and seals the entrance into the gauge tube. This sealing occurs immediately upon any lowering of the pressure sufficient to permit a return of liquid into the gauge tube. The sealing of the exit through the fitting 20 is rapidly effected and maintained, because the water in extension 33 is under the pressure of the water head in the outer tube plus the pressure of any air above this water. This combined water and air pressure is of course greater than the pressure of the air attempting to move downwardly through tube 24 into the fitting 20.

In practice the back rush of liquid has sometimes been found so great that it rushes through the gauge tube 1, pipe 17, and into the pressure source when the pipe 17 is directly connected to the high pressure side contaminating the pressure source and causing a loss of some liquid thereby impairing the operation of the gauge. To avoid this, pipe 17' extending at right angles to pipe 17 a substantial distance above the upper edge of the gauge tube is provided and acts as a check or obstruction for the liquid preventing the loss of liquid through overflow into the pressure source by checking the forward flow of the liquid and causing it to return to the gauge tube.

To use the gauge as a differential pressure indicating device to indicate pressures above atmospheric, pipe 19 is connected to the pressure source, as hereinbefore described, and pipe 36 simply vented to the atmosphere. The device may also be used to indicate pressures below atmospheric by connecting pipe 37 to the pressure source and venting pipe 19 to the atmosphere.

It will be noted that the gauge tube 1 is of comparatively small diameter and capacity, whereas the outer tube 34 which is in communication with the gauge tube through the inner tube 24 and pipe 20 is of comparatively large diameter and capacity. In view thereof, the amount of liquid in the gauge tube as compared with that in the outer tube is small and the displacement thereof into the outer tube 34 for varying differential pressures may be disregarded for reliable working results. In the conventional type U-gauge it is necessary to take readings of the liquid level in each arm of the U and then combine these readings to obtain the differential pressure existing in the gauge. Both arms of the U being of substantially identical diameter and capacity, the liquid level is forced down in one arm substantially the same amount that it is raised in the other and readings of both are essential to determine the differential pressure. In my gauge however the capacity of tube 34 is comparatively large as compared with that of gauge tube 1 so that upon the existence of a differential pressure in tubes 1 and 34, the rise in liquid level in outer tube 34 is so small that it may be regarded for reliable working results as a negligible factor on the pressure readings. In fact for readings corresponding to liquid levels in the upper part of gauge tube 1, there is no perceptible change of liquid level in outer tube 34. In view thereof the readings corresponding to the liquid levels of outer tube 34 may be disregarded and the reading of the liquid level in the gauge tube 1 may be regarded for reliable working results as a proper indication of the differential pressure existing in pipes 37, 19.

It will be understood that while a specific embodiment of the invention has been shown and described, various changes in the details thereof may be made by those skilled in the art and the invention is not to be limited to the structure disclosed, but only by the scope of the appended claims.

What is claimed is:

1. A pressure indicating device comprising a gauge tube arranged to contain pressure indicating liquid, a tube connected to said gauge-tube, a third tube connected to said gauge-tube and having one end communicating with said second tube at a point below the connection between said gauge-tube and said third tube and having the other end vented to said second tube at a point above the normal level of pressure liquid in said second tube.

2. A U-gauge pressure indicating device comprising a gauge-tube forming one arm of the U arranged to contain a pressure indicating liquid and connected to a source of pressure, an outer tube in communication with a source of lower pressure, and a tube within said outer tube connected to said gauge-tube to form the other arm of said U-gauge, said inner tube being provided with openings arranged to permit the discharge of liquid into the outer tube when an abnormal pressure is applied to said gauge-tube and permitting the return of the liquid into the gauge-tube upon a decrease of pressure therein, thereby preventing the formation of bubbles in the gauge-tube.

3. A pressure indicating device comprising a gauge tube arranged to contain a pressure indicating liquid and connected to a source of pressure, an outer tube in communication with a source of lower pressure, a tube within said outer tube and connected to said gauge-tube, said inner tube having a portion extending below said connection to the gauge-tube, the end of said inner tube extending below said connection to the gauge-tube being vented to said outer tube, said extending portion being arranged to permit the discharge of the liquid into the outer tube when an abnormal pressure is applied to said gauge-tube and permitting the return of the liquid into the gauge tube upon a decrease of pressure in said gauge-tube sufficient to permit the return of the liquid.

4. A pressure indicating device comprising a gauge-tube arranged to contain a pressure indicating liquid and connected to a source of pressure, an outer tube in communication with a source of lower pressure and a tube within said outer tube, said inner tube having its lower portion extending to substantially the bottom of the outer tube, being connected intermediate its ends with said gauge tube and being vented at both the top and bottom to said outer tube, whereby an abnormal pressure in the gauge-tube causes a discharge of the pressure indicating liquid into the outer tube and a decrease of said abnormal pressure causes a return of the liquid into the gauge-tube through said lower extending portion of the inner tube thereby preventing the formation of bubbles in said gauge-tube.

5. A differential pressure gauge of the U-type, comprising a gauge-tube, forming one arm of the U-gauge, an outer tube of greater length than said gauge-tube and an inner tube within said outer tube connected to said gauge-tube vented to said outer tube and forming the other arm of said U-gauge, said connection between the inner tube and said gauge-tube occurring intermediate the ends of said inner tube.

6. A differential pressure gauge of the U-type, comprising a gauge-tube, forming one arm of the U-gauge, a second tube of greater length than said gauge-tube and of substantial capacity as compared with said gauge-tube and connected to said gauge-tube, and a third tube connected to said gauge-tube, said connection between the third tube and said gauge-tube occurring intermediate the ends of said third tube, one end of said third tube being vented to said second tube, above the normal level of liquid therein, and the other end of said third tube being vented to substantially the base of said second tube.

7. A differential pressure gauge comprising a gauge-tube of small diameter, an outer tube of substantial diameter and of greater length than said gauge-tube, an inner tube within said outer tube connected to said gauge-tube and an extension tube connected to the junction point of the gauge-tube and inner tube and vented to the bottom of said outer tube.

8. In a differential pressure gauge, a gauge-tube in communication with a source of pressure, an outer tube of greater length than said gauge-tube in communication with a source of lower pressure, a tube within said outer tube connected at the bottom to the gauge-tube and having its upper portion vented to the outer tube and an extension tube in communication with the junction point of said inner tube and said gauge-tube and extending to substantially the bottom of said outer tube.

9. A pressure indicating device comprising a gauge-tube, a frame within which said tube is mounted, the rear wall of said frame having graduations to provide a scale for said tube, an outer tube of substantial capacity as compared with said gauge-tube disposed in parallel relation to said gauge-tube and of greater length than said gauge-tube, an inner tube within the outer tube connected at its lower end to the gauge-tube and provided with an extension below said connection, said extension being vented to the lower portion of the outer tube, said inner tube having its upper portion vented to said outer tube so that the liquid emerging from said upper portion is directed towards the sides to the bottom of said outer tube, a pipe connected to a source of pressure and to the top of said gauge-tube, a second pipe connected to a source of lower pressure and to the top of said outer tube and a clamp for fastening said frame to said outer tube.

10. A pressure indicating device comprising a gauge-tube, a frame, top and bottom fittings for securing said gauge-tube within said frame, an outer tube of substantial capacity as compared with said gauge-tube, disposed in parallel relation to said gauge-tube and of greater length than said gauge-tube, a valve in the lower portion of said outer tube, an inner tube within the outer tube connected at its lower end to the gauge-tube and provided with an extension below said connection, a four-way and a T-fitting connected to the upper portion of said inner tube and vented to the outer tube, a pipe extending above the upper end of the gauge-tube, connected to a source of pressure and the top of said gauge-tube, and a second pipe connected to a source of lower pressure and to the top of said outer tube.

In witness whereof, I have hereunto set my hand.

GEORGE R. STEERE.